Aug. 8, 1933.  W. R. GREEN  1,921,520
HEDGE TRIMMER
Filed Sept. 26, 1930  2 Sheets-Sheet 1
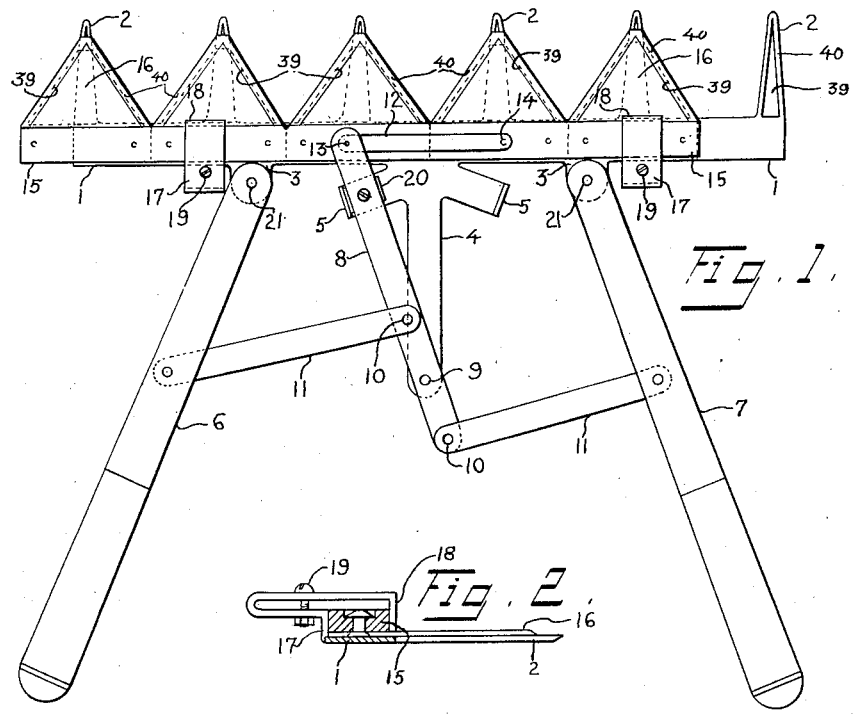
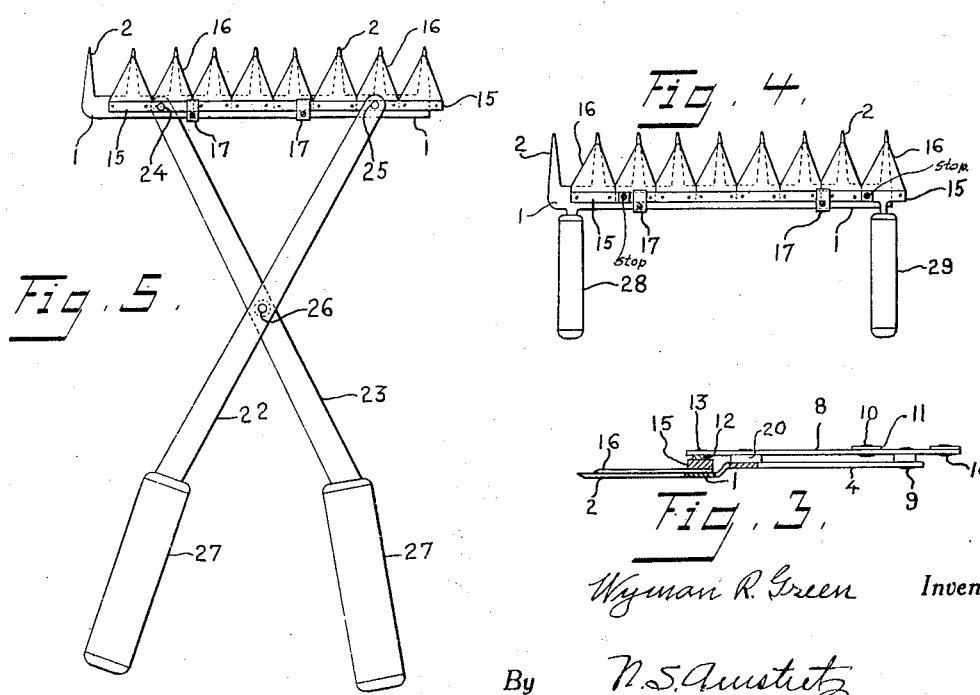

Aug. 8, 1933.  W. R. GREEN  1,921,520
HEDGE TRIMMER
Filed Sept. 26, 1930  2 Sheets-Sheet 2
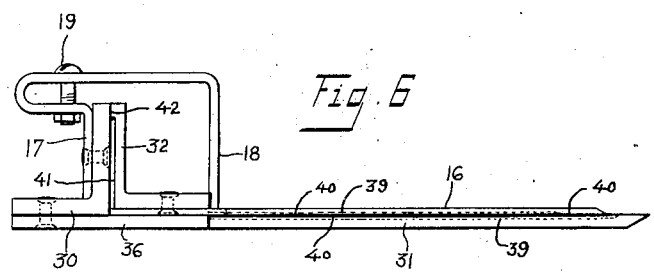
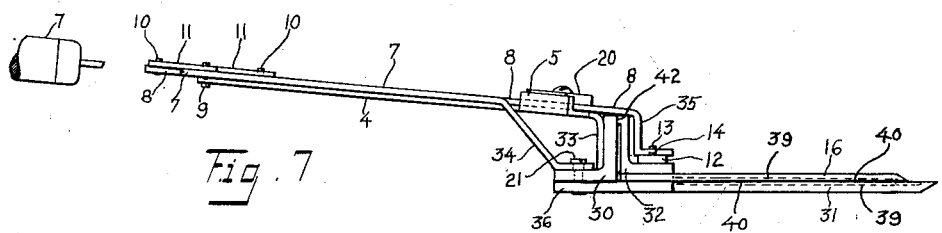
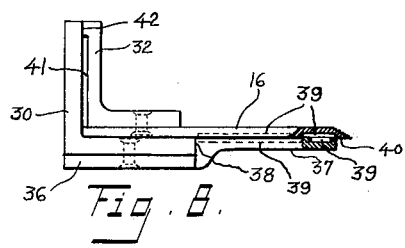
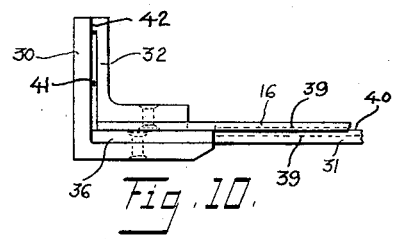
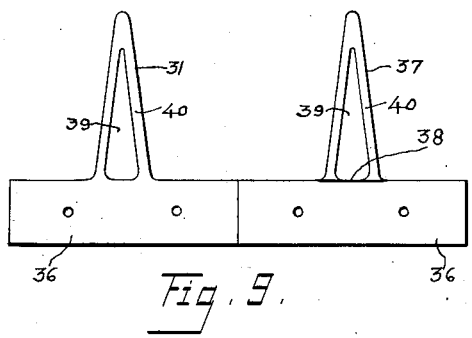
Wyman R. Green  Inventor
By  Attorney Patented Aug. 8, 1933

1,921,520

UNITED STATES PATENT OFFICE 1,921,520

HEDGE TRIMMER

Wyman R. Green, Chattanooga, Tenn.

Application September 26, 1930
Serial No. 484,593

5 Claims. (Cl. 30—11)

My invention relates to improvements in hedge trimmers and it more especially consists of the features pointed out in the claims.

The purpose of my invention is to provide a simple self-contained hedge trimmer; that has a stationary bar with a series of projecting fingers; that has a sliding bar with a series of cutting sections mounted on it; that provides operating handles for producing movement between the bars; and that, in addition, provides means for holding the bars in operative relation to each other by means of a take-up in an adjustable manner.

With these and other ends in view, I illustrate on the accompanying drawings such instances of adaptation as will disclose the broad underlying features without limiting myself to the specific details shown thereon and described herein.

Figure 1 is a top plan view of a hedge trimmer showing the handles spread apart and separately pivoted.

Fig. 2 is a transverse section of adjacent bars and the adjustable tension and retaining device.

Fig. 3 is a detached elevation of the actuating arm.

Fig. 4 is a top plan view of a reciprocating rigid handle type of trimmer.

Fig. 5 is a top plan view of a trimmer having crossed handles pivoted to each other.

Fig. 6 is an enlarged end elevation of another form of supports.

Fig. 7 is an enlarged end elevation showing a modified form of supports and operating handles etc.

Fig. 8 is another form of supports.

Fig. 9 is a detached plan view of two forms of fingers.

Fig. 10 is a modification of Fig. 8.

In producing my trimmer I may use whatever alternative or equivalent details of construction which the exigencies of varying conditions may demand without departing from the broad spirit of the invention.

In Figures 1, 4 and 5 bars 1 are shown which have projecting guards or fingers 2 and sliding bars 15 on which triangular cutting sections 16 are secured. These bars are positioned in engagement with each other, the bar 15 sliding against the bar 1. They are held against displacement by a projection 17 of the bar 1 (Fig. 2) which forms a guide for the bar 15. In addition, a depending tongue 18 on the projection 17, by means of a screw or bolt 19, serves to place any desired degree of tension on the bar 15 and sections 16 so as to keep them in close cutting relation to the guards 2. These features of construction are quite independent of various means for producing displacement between the fingers 2 and the sections 16.

Movement may be imparted to the trimmer in a number of different interrelated ways, among which I have instanced the examples shown in Figures 1, 4 and 5. Any desired means for producing movement between the cooperating cutting parts, while these are held against separation and under a controllable tension come within the broad scope of the invention. It is immaterial whether the means—handles of any desired type—be rigidly or pivotally connected to the respective parts.

When operating handles are separately pivoted to the trimmer unit, and not directly to each other (Fig. 1), they contrast with handles that cross each other and which are pivoted together and to the trimmer unit (Fig. 5), and handles that are rigidly connected to the unit (Fig. 4).

The structure exemplified in Fig. 1 comprises a bar 1 having fingers 2 projecting from its front edge. Along the rear edge ears 3 are formed. Between these ears a projection 4 of the bar 1 is positioned. This may be formed integral with the bar, or as a separate piece secured by riveting, electric welding or otherwise. The projection 4, near the bar 1 has two side extensions which terminate in upstanding stops 5 and the actuating arm 8 is pivoted to the projection 4 at 9. This arm 8 is connected at 13 by means of a link 12 to the sliding bar 15, at 14.

As the arm 8 is rocked on its pivot 9 the cutting sections 16 are moved to and fro across the fingers 2. This movement is accomplished by means of two handles 6 and 7. Handles 6 and 7 are pivoted at 21, to the ears 3. Links 11 are pivoted, at 10 to the arm 8, one above and one below the pivot or fulcrum 9 and to the handles at points approximately opposite the pivotal point 9. In order that the mechanism shall operate as quietly as possible, a rubber block 20 is secured to the under side of the arm 8 so as to engage the stops 5, at the extreme of each movement.

In case a pair of handles 27 attached to arms 22 and 23 are used, the arms are pivoted to each other at 26 where they cross each other. The arm 23 is pivoted to the under side of the bar 1 at 24 and the arm 22 is similarly pivoted to the bar 15 at 25. A simplified form of trimmer is exemplified in Fig. 4. In this, the bar 1 has a rigid handle 28, and the bar 15 has a rigid handle 29 attached to it in any desired manner.

The operation of my device is very simple. As the handles of any one of the types instanced are moved toward or away from each other the cutting sections 16 traverse across the open space between the fingers 2 and any twigs or hedge stems which project between the fingers will be cut off. The type instanced in Fig. 4 may be specially adaptable to young and tender hedge growths while the other types are equally adapted to heavy growths. The cutting edges of the sections 16 may be serrated if desired. It is understood that I do not limit myself to any specific materials, as to lightness etc., so long as the parts are sufficiently strong to withstand the stresses to which they are subjected and the cutting edges and the adjacent finger faces retain their hardness for a reasonable time.

I illustrate in Figs. 6-10 inclusive certain modifications which may be used, or any equivalents thereof, as desired. Instead of the flat bars 1 and 15, instanced in Figs. 1-3 inclusive I may use angle irons 30 for fingers 31 and angle irons 32 for the sections 16. These may be arranged as shown in Figs. 6 and 7, or as exemplified in Figs. 8 and 10. In Figs. 6 and 7 the angles 30 and 32 are placed back to back. The fingers 31 are riveted on the underside of the angle 30 or they may be spot welded or secured in any other manner. In Fig. 8 the angles are nested against each other. The fingers 37 have an off-set 38, which engages the edge and underside of the angle 30. In Fig. 10 fingers 31 are placed on top of the horizontal portion of the angle 30 and the sections above the fingers.

When the parts are arranged as exemplified in Figs. 6, 7 and 8-10 the handles 6 and 7 have their forward ends bent downward and forward at 34 to serve instead of the ears 3 shown on Fig. 1. At this point they are pivoted to the angle support 30, at 21. The central support 4 is bent down at its outer end at 33 where it may be riveted or otherwise secured to the angle bar 30. The operating arm 8 is bent down and outward at its free end, at 35, similar to the bend 34 of the handles 6 and 7, to receive the link 12 in pivotal relation at 13.

When angle bars 30 are used the tension members 17 are riveted or otherwise attached to the vertical portion of the angles. The handles 22, 23, 28 and 29 may be attached to the bars 30 and 32 in any desired manner. It is immaterial that the rubber buffer 20 be attached to the arm 8 on its under or upper face, or made a part of the stops 5. The fingers 2, 31 and 37 may have a T end 36 of such length as to space the fingers the proper distance apart on the supports 1 or 30. Under certain circumstances of manufacture the fingers may be made integral with a support in any desired manner. The number of fingers or guards and associated cutting sections may be varied.

In the use of off-sets 38 the fingers 37 are aligned with the horizontal portion of the angle 30 and if they are assembled as instanced in Fig. 10 the fingers 31, by reason of the T ends 36 will align themselves against the vertical portion of the angle 30. At any event the lower edge of 38 and the forward edge of 30 will be beveled to permit the trimmed hedge branches to easily slide past.

When trimming hedges a sticky juice exudes from the cut-off ends of the twigs which has a tendency to clog the cutting elements if the engaging surfaces of the fingers and sections is large. This may be advantageously overcome by recessing the adjacent faces at 39 so as to leave only narrow surfaces 40 which work in close contact with each other, thus reducing friction of the sliding parts. To still further reduce friction and secure an easily workable trimmer I may relieve the adjacent surfaces of sliding parts as instanced in Figures 6, 7, 8 and 10 whereon a narrow bearing face 42 is formed. This may be formed on either one of the supports. Recesses 41 reduce the sliding contacts to the narrow margins 42.

What I claim is:

1. In hedge trimmers, an indented edge support, a serrated edge cutting member, a pair of handles pivoted to the support, a center arm pivoted to a projection of the support and projecting on opposite sides of the pivot, a link connecting the free end of the arm to the cutting member, means for holding the support and cutting member in slidable relation to each other, and separate links from each handle to the center arm on opposite sides of its pivot.

2. In hedge trimmers, a pair of angle bars slidable against each other, a plurality of cutting fingers on one bar, a plurality of cutting blades on the other bar, means for holding the blades in operative engagement with the fingers, a pair of handles separately pivoted on the angle bar to which the fingers are attached, a projection from said angle bar between the handles in a rearward direction, an arm pivoted on said projection, and a link from the arm attached on opposite sides of its pivot said links being pivoted to the handles.

3. In hedge trimmers, a slidable angle bar, a plurality of recessed cutting blades projecting therefrom, a separate stationary angle bar, a plurality of recessed cutting fingers projecting therefrom, means for operatively holding the fingers and blades in close relation to each other, a support projecting from the finger bar, an operating lever or arm pivoted to the support, a connection from the arm to the blade bar, cushioning means adjacent the extremes of movement of the knife bar actuating arm, and manual means for moving the arm to and fro between the cushioning means comprising a pair of handles pivoted to the stationary bar and separately connected to the arm.

4. In hedge trimmers, a lower stationary angle bar support having a plurality of cutting elements along one edge, a similar upper movable angle bar having a plurality of cutting elements along its one edge adjacent the other cutting elements, means dependent on the vertical legs on each angle to maintain the angles and the cutting elements in operative relation to each other, actuating handles directly pivoted to the non-movable support, interconnecting means between the handles and the upper or slidable angle bar adapted to move the cutting elements of such bar across the stationary cutting elements of the supporting bar with equal movement of the handles whereby the trimmer will always cut a definite width.

5. In hedge trimmers, a movable angle bar support, a plurality of cutting fingers secured thereon, a non-movable angle bar support on which the movable bar slides, a plurality of cutting elements secured on the non-movable support adjacent the cutting fingers, actuating means comprising separate handles pivoted on the non-movable bar, a lever arm pivoted to a projection of said bar and adapted to equalize the movement of the handles, and a separate link from each handle to the lever arm whereby lateral movement is imparted to the movable bar while at the same time preventing lateral motion of the immovable bar.

WYMAN R. GREEN.